G. ZANNI.
Telegraph-Cables.

No. 156,399. Patented Oct. 27, 1874.

UNITED STATES PATENT OFFICE.

GEMINIANO ZANNI, OF HIGHBURY, ENGLAND.

IMPROVEMENT IN TELEGRAPH-CABLES.

Specification forming part of Letters Patent No. 156,399, dated October 27, 1874; application filed August 22, 1874.

*To all whom it may concern:*

Be it known that I, GEMINIANO ZANNI, of Highbury, in the county of Middlesex, England, gentleman, have invented certain Improvements in Submarine and other Telegraphic Cables, of which the following is a specification:

This invention has for its object the manufacture of a submarine or other telegraphic cable of great strength and cheapness compared with its weight and diameter, and also in a great measure to avoid induction currents of electricity, whereby the conductivity of the cable is increased, so as to transmit signals through it with great rapidity. For this purpose, according to these improvements, the conductor, consisting of one or more copper wires, is covered or inclosed within a series of soft-iron wires, which are united together to form a strand or core by passing the combined series of wires through a bath of molten tin, or other comparatively soft metal. The strand or core thus combined into one solid body is of great strength compared with ordinary core-conductors, being effectually protected from corrosion. It is then coated or covered with gutta-percha or other insulating materials, over which tin or other metal foil is wrapped, to exclude moisture; or, in place of being protected with tin-foil, the core so far prepared is covered with a cotton or other tape or material, and is passed through a bath of molten tin or other soft metal, so as to cover or incase the core therein. The casing of tin or other soft metal protects the insulating material from the injurious effects of the great pressure to which submarine cables are subjected when very deeply submerged. A tape of hemp or other material immersed in tar or other preservative substance or material is then wound around the core, to protect the metal foil or protecting metal casing from injury or corrosion. Several of the core-conductors thus made up may be combined together in forming a submarine or other telegraphic cable in accordance with my improvements.

And in order that my invention may be more clearly understood, I will proceed to describe the drawings hereunto annexed.

Figure 1:
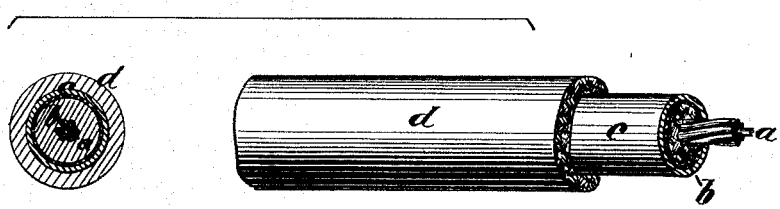

Figure 1 shows part of a single-core conductor for a telegraphic cable constructed and arranged in accordance with my improvements.

The metal conductor $a$ consists of a single copper wire inclosed within or surrounded by a series of soft-iron wires, which are then united together by passing the combined series of wires through a bath of molten tin, or other comparatively soft metal, by which arrangement great tensile strength is imparted to the metal conductor $a$. In place of a single copper wire, several smaller copper wires, of proportionate strength to a single wire, may be employed to form the center of the metal conductor $a$. For some purposes the central copper-wire conductor (or wires) may be dispensed with, and one or a series of soft-iron wires only may be combined together to form the metal conductor. The metal conductor $a$ thus made up is then coated or covered with gutta-percha, or other insulating materials, as is well understood, and I prefer to wind upon or cover the insulating material with a tape of cotton, or other material, and then pass the core thus covered through a bath of molten tin or other soft metal, arranged with a die to regulate the thickness of the metal, which, by this means, forms a tubular cover or casing, $c$, around the insulating materials. The metal cover or casing $c$ protects the insulating materials from the excessive pressure to which it would otherwise be exposed when very deeply submerged. The metal casing or tube $c$ is finally protected from injury and corrosion by a wrapper of hemp or other suitable material, $d$, saturated with or immersed in tar or other preservative material.

Figure 2:
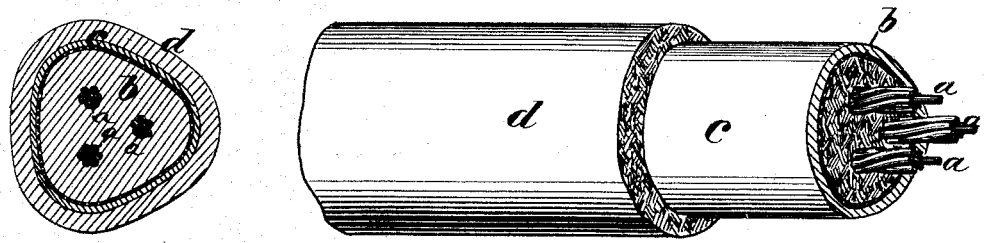

Fig. 2 shows part of a telegraphic cable constructed with a series of three separate insulated conductors combined together and inclosed in a metal casing, $c$, in accordance with my invention. In like manner other numbers of insulated conductors $a$, constructed in accordance with my invention, may be arranged and inclosed within a metal cover or casing, $c$, as previously described.

The shore end of a submarine cable constructed in accordance with my invention may be further protected by threading it through lengths of gas-tubing, the ends of the tubes being screwed together in succession as they are placed in position upon the cable; or the cable may be protected with a series of iron wires wound or laid upon the outer surface, as is well understood in the construction of submarine cables.

Having thus described the nature of my invention, and the manner of performing or carrying the same into practice, what I claim is—

A cable consisting of one or more conductors, each surrounded, first, by spirally-twisted wires; second, by a coating of tin, applied thereto by passing the twisted-wire cable or cables through a bath of molten tin; and, third, by a wrapping of fibrous or other insulating or protecting material, substantially as shown and described.

<div style="text-align:right">GEMINIANO ZANNI.</div>

Witnesses:
   ED. BLAKE,
      34 *Southampton Buildings,*
          *Chancery Lane,* W. C.
   G. T. WARREN,
      17 *Gracechurch Street, London.*